(12) United States Patent
Clark

(10) Patent No.: US 6,408,567 B1
(45) Date of Patent: Jun. 25, 2002

(54) FISHING LURES AND METHODS AND MOLDS FOR MAKING SAME

(75) Inventor: Michael R. Clark, Pineville, LA (US)

(73) Assignee: Knight Manufacturing Co., Inc., Tyler, TX (US)

( * ) Notice: Subject to any disclaimer, the term of this patent is extended or adjusted under 35 U.S.C. 154(b) by 0 days.

(21) Appl. No.: 09/802,771

(22) Filed: Mar. 12, 2001

(51) Int. Cl.⁷ .............................................. A01K 85/00
(52) U.S. Cl. ...................... 43/42.53; 264/220; 264/299; 264/338
(58) Field of Search .............................. 43/42.53, 42.24, 43/42.35; 264/219, 220, 299, 338

(56) References Cited

U.S. PATENT DOCUMENTS

| | | | | |
|---|---|---|---|---|
| 1,038,115 A | * | 9/1912 | Gillies | 264/220 |
| 2,500,494 A | * | 3/1950 | Jeffers | 43/42.53 |
| 3,410,936 A | * | 11/1968 | Juras | 264/220 |
| 3,526,988 A | * | 9/1970 | Young | 43/42.53 |
| 3,947,232 A | * | 3/1976 | Foster | 264/299 |
| 3,950,477 A | * | 4/1976 | Di Giacomo | 264/338 |
| 4,074,455 A | * | 2/1978 | Williams, Jr. | 43/42.06 |
| 4,095,008 A | * | 6/1978 | Sundstrom et al. | 264/299 |
| 4,108,955 A | * | 8/1978 | Thom | 43/42.53 |
| 4,197,667 A | * | 4/1980 | Helfenstine et al. | 43/42.24 |
| 4,238,444 A | * | 12/1980 | Thom | 264/220 |
| 4,437,257 A | * | 3/1984 | Kluge | 43/42.53 |
| 4,585,417 A | * | 4/1986 | Sozio et al. | 264/338 |
| 4,913,868 A | * | 4/1990 | Ito et al. | 264/299 |
| 4,960,622 A | * | 10/1990 | Jarboe et al. | 264/220 |
| 5,169,578 A | * | 12/1992 | Fukao | 264/220 |
| 5,333,405 A | * | 8/1994 | Bowles | 43/42.24 |
| 5,379,544 A | * | 1/1995 | Davidson | 43/42.24 |
| 5,494,432 A | * | 2/1996 | Coggins et al. | 43/42.24 |
| 5,517,781 A | * | 5/1996 | Paoletta, Jr. | 43/42.24 |
| 5,609,802 A | * | 3/1997 | Jeng | 264/338 |
| 5,667,739 A | * | 9/1997 | Kato | 264/138 |
| 5,672,305 A | * | 9/1997 | Kogure | 264/338 |
| 5,689,910 A | * | 11/1997 | Kato | 43/42.24 |
| 5,725,892 A | * | 3/1998 | Gibbs | 43/42.53 |
| 5,893,231 A | * | 4/1999 | Kato | 43/42.24 |
| 5,943,811 A | * | 8/1999 | Packer | 43/42.24 |
| 5,996,271 A | * | 12/1999 | Packer | 43/42.24 |
| 6,012,248 A | * | 1/2000 | Kechriotis | 43/42.53 |
| 6,171,091 B1 | * | 1/2001 | Bettencourt | 264/220 |
| 6,247,261 B1 | * | 6/2001 | Kechriotis | 43/42.53 |
| 6,266,916 B1 | * | 7/2001 | Dugan | 43/42.24 |
| 6,293,779 B1 | * | 9/2001 | Firmin | 43/42.53 |

FOREIGN PATENT DOCUMENTS

| | | |
|---|---|---|
| JP | 2-60537 B1 * | 3/1990 |
| JP | 5-284883 B1 * | 11/1993 |
| JP | 2000-333558 B1 * | 12/2000 |

* cited by examiner

Primary Examiner—Darren W. Ark
(74) Attorney, Agent, or Firm—Charles M. Kaplan

(57) ABSTRACT

A soft plastic fishing lures may be made to float by incorporating air bubbles therein by methods and in molds that draw air from inside the molds in which the lures are cast.

18 Claims, 5 Drawing Sheets

FISHING LURES AND METHODS AND MOLDS FOR MAKING SAME

BACKGROUND OF THE INVENTION

This invention relates to fishing lures, and more particularly, to soft bodied fishing lures that float, and to molds for and methods of making floating fishing lures. Floating soft bodied fishing lures have been made by adding to plastic formulations chemicals that produce gas bubbles in the cured plastic. The resulting lures were tough and not natural feeling, and the colors were opaque and difficult to control. Also, air has been incorporated by agitating melted plastic before a lure body is formed, but the size, location and distribution of air bubbles in the lure can not be controlled. Selected areas of prior lures could not be made devoid of bubbles.

OBJECTIVES OF THE INVENTION

Accordingly, it is an object of this invention to provide improved fishing lures and improved molds for and methods of making the lures.

Another object is to encapsulate air bubbles in fishing lure bodies without diminishing the transparency or translucency of the plastic from which the lures are made.

An additional object is to provide floating fishing lures that have craters on their exterior surface for holding scenting and taste imparting agents.

Another object is to control the number and location of air bubbles in fishing lures.

An additional object is to provide fishing lures that have air bubbles in preselected locations but have no bubbles in other preselected areas.

A further object is to place differently sized air bubbles in different selected locations in fishing lures.

Another object is to provide methods and molds that can locate air bubbles only in predetermined portions of fishing lures and prevent the bubbles from forming in other predetermined portions of the lures.

A further object is to provide floating plastic fishing lures that are durable, economical, highly attractive to fish, easy to use, and which do not possess defects found in similar prior art lures.

A further object is to control the size of air bubbles in plastic fishing lures.

A further object is to provide improved methods for making the fishing lures described herein.

Another object is to provide porous molds that breathe and control the size and location of air bubbles in plastic fishing lures.

Other objects and advantages of the fishing lures and manufacturing methods and molds incorporating this invention will be found in the specification and claims and the scope of the invention will be set forth in the claims.

DESCRIPTION OF THE INVENTION

Figure 1:
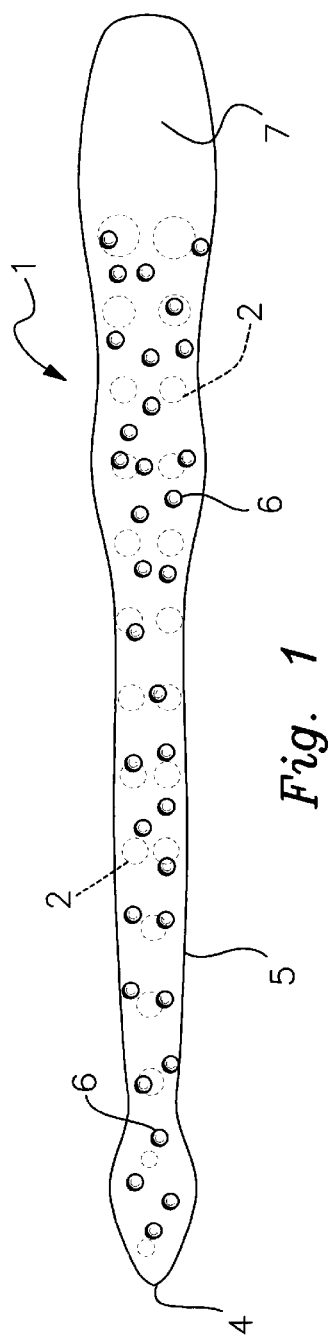
FIG. 1 is a schematic top plan view of a fishing lure in accord with this invention.

The drawing shows a soft natural feeling, flexible fishing lure 1 in accord with this invention. A number of spaced visible air bubbles 2 are encapsulated inside of the body of the lure. The air bubbles adjacent one end 3 of the lure may be a different size from the bubbles adjacent the other end 4. The upper surface 5 of the lure 1 may be essentially smooth and uninterrupted except that it may have randomly located pock marks or craters 6. A portion 7 of the lure at the end 3 may be solid and bubble free to facilitate impaling the lure on a hook or for connecting the lure to other rigging.

Preferably, the lure 1 is made from a soft, flexible, natural feeling synthetic plastic material, such as a thermoplastic plastisol resin formulation that includes polyvinyl chloride plasticized with esters of phathalate. It is also preferred that the lure body be colored and translucent or transparent so that the bubbles 2 are visible. However, natural and synthetic rubbers may be used for the body of lure 1 as may thermosetting synthetic plastics.

Figure 2:
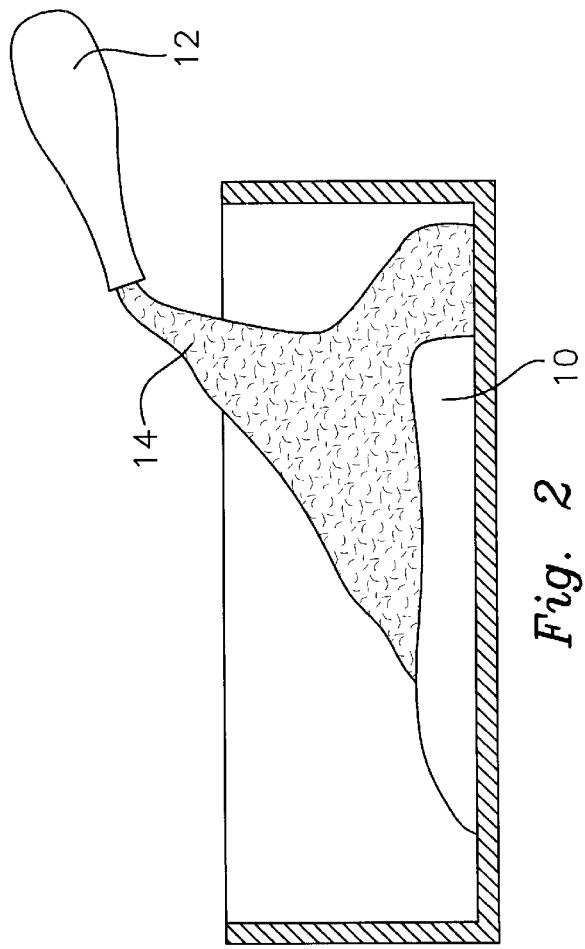
FIG. 2 is a schematic partially cross sectional side view of a step in a process of making fishing lures in accord with this invention.
Figure 3:
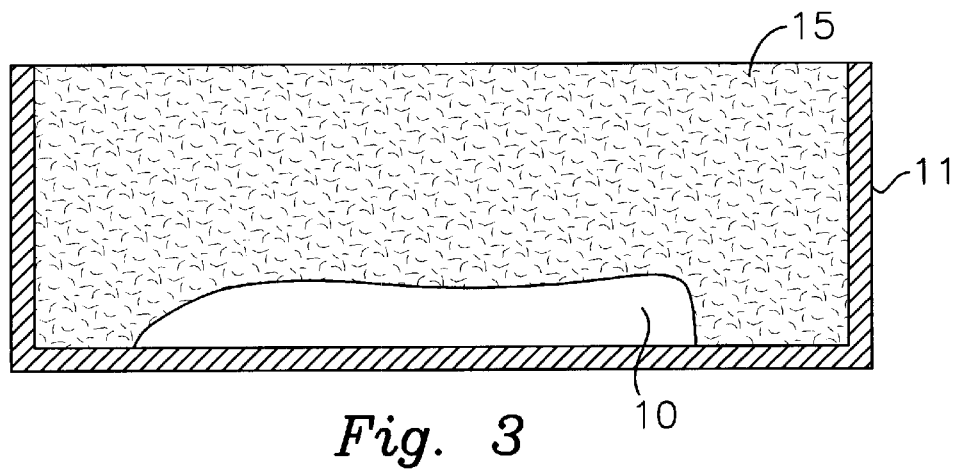
FIG. 3 is a schematic partially cross sectional side view of another step in the process of making fishing lures.

The lure 1 may be made by the process illustrated in FIGS. 2–10. In FIG. 2 a model 10 of the lure 1 has been placed on the bottom of a container 11. The model 10 may be shaped to resemble any aquatic or land creature upon which fish feed, or it may have an unnatural shape that provokes fish to strike. A supply 12 of uncured ceramic slip 14 is poured into the container embedding the model 10 in the slip. The slip 14 is allowed to cure around the model 10 and thus to produce the mold 15, as shown in FIG. 3. The cured slip must be porous and must have air entrained therein so that the body of mold 15 will be a breathing porous mass of pores and interstices that permit the passage of air there through. Mackie's premixed ceramic slip from Mackie Newton Ceramics, Inc. has been used to practice this invention.

Figure 4:
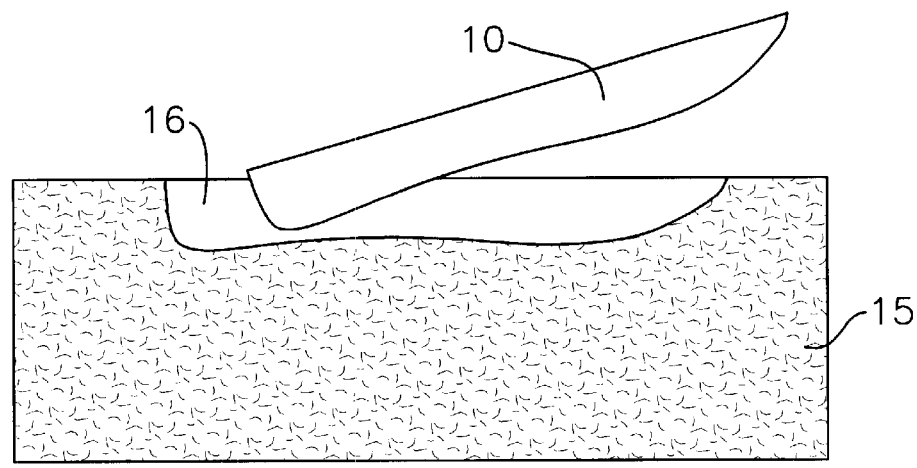
FIG. 4 is a schematic partially cross sectional side view of another step in the process of making fishing lures.
Figure 5:
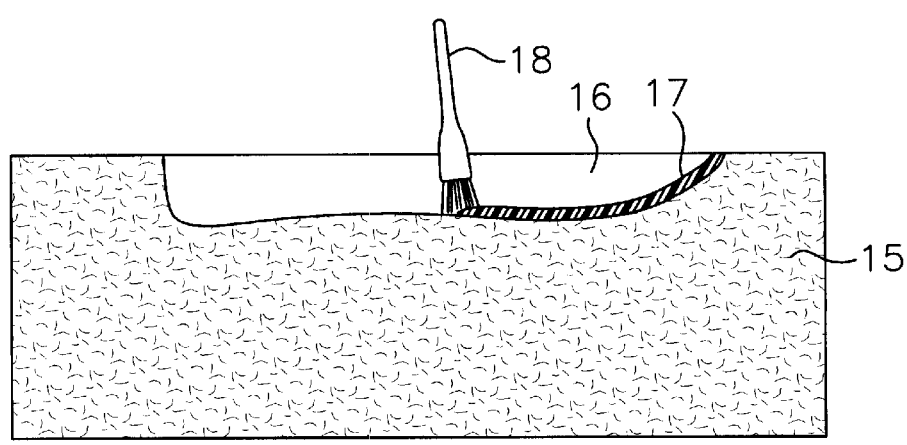
FIG. 5 is a schematic partially cross sectional side view of another step in the process of making fishing lures.

After the slip 14 has cured, the mold 15 is removed from the container 11, and the model 10 is removed from the body of the mold, as shown in FIG. 4. The space previously occupied by the model 10 defines the mold cavity 16 in which the lure 1 will be cast. The cavity 16 must be sealed by completely coating the cavity with a ceramic glaze 17 that is impervious to air. The glaze 17 may be applied by painting in on the surfaces of the cavity with a brush 19. After the glaze 17 has cured, it must seal the porous body of the mold 15 from contact with hot molten material from which the lure 1 will be cast. Duncan's 1N1001 clear Infinity premixed ceramic glaze has been used to practice this invention.

Figure 6:
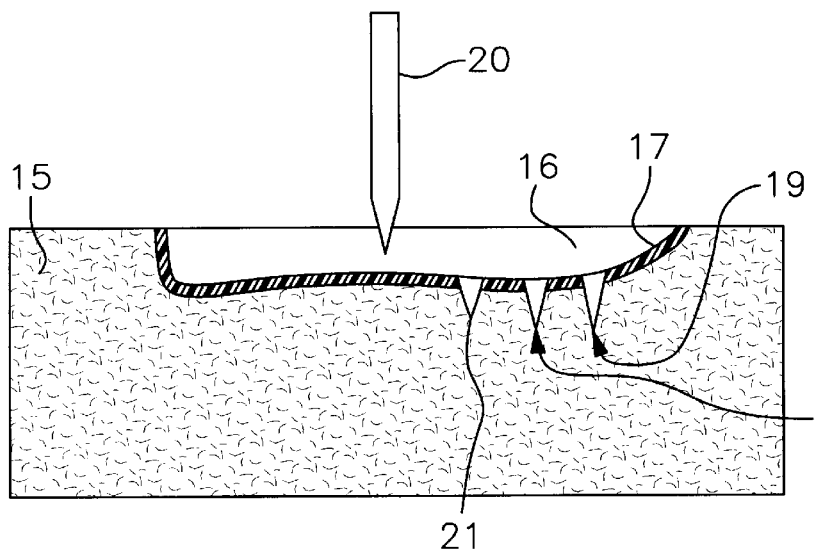
FIG. 6 is a schematic partially cross sectional side view of another step in the process of making fishing lures.

The seal produced by the cured glaze 17 must be broken by openings 19 that penetrate into the porous mold body. The openings 19 may be holes or scratches of any shape. As shown in FIG. 6, the cured glaze 17 may be punctured with a sharp tool 20, such as an awl or a needle, to produce circular holes 21 that penetrate through the glaze into the porous ceramic of the mold body. The tool 20 also may be used to scratch through the cured glaze. Alternatively, the holes 21 may be drilled through the glaze and into the mold body. This exposes the interior of the mold to the atmosphere when the cavity 16 is empty. It has been discovered that when the holes 21 are sized as disclosed herein, the air entrained in the porous mass of the mold 15 can be released into the body of the lure 1 during the casting process, and the molten plastic will not clog the holes 21. The holes 21 should be no larger than about 0.050 inches and no smaller than about 0.0001 inches.

Figure 7:
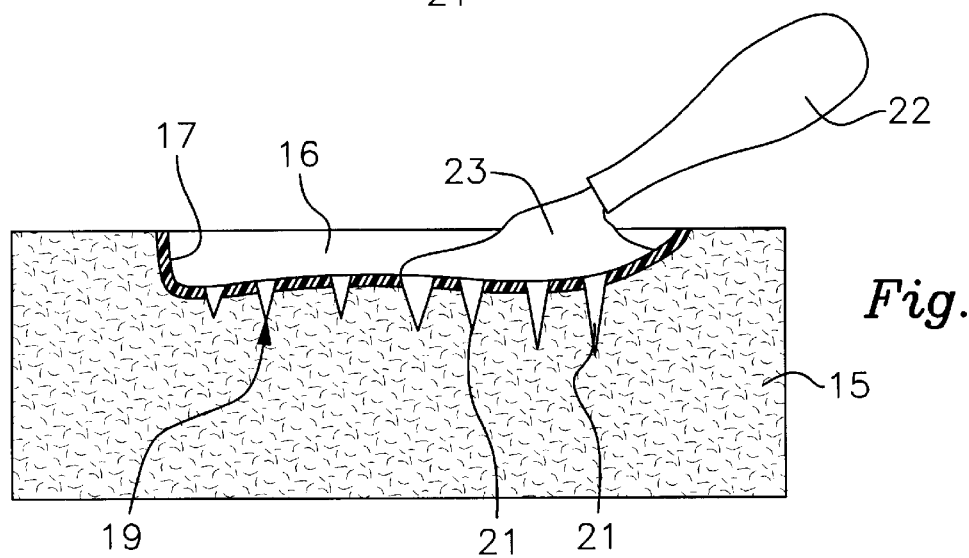
FIG. 7 is a schematic partially cross sectional side view of another step in the process of making fishing lures.
Figure 8:
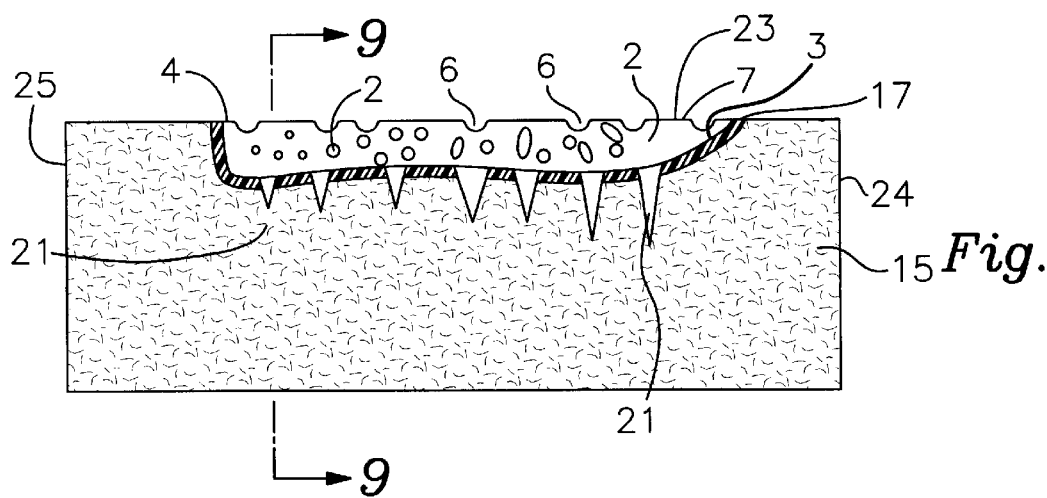
FIG. 8 is a schematic partially cross sectional side view of another step in the process of making fishing lures.
Figure 9:
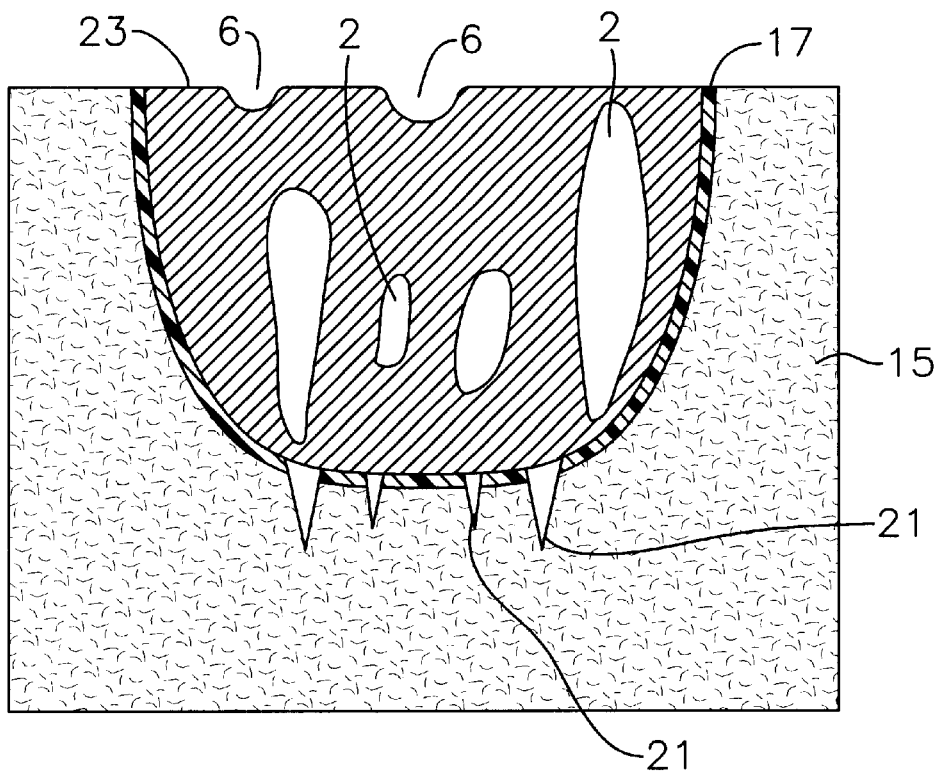
FIG. 9 is an enlarged cross sectional view taken generally along the line 9—9 in FIG. 8.

FIG. 7 shows a supply 22 of molten plastic resin 23 that has been heated to a preferred range of about 280 to about 400 degrees Fahrenheit being poured into the cavity 16. The cavity is essentially filled, as shown in FIGS. 8 and 9, and the resin is permitted to cure as it cools to about the ambient or room temperature. Air from the interior of the porous mold will rise into the molten plastic 23 and form the bubbles 2 therein. The air from inside the mold is pushed upwardly because the hot plastic in the above temperature range heats the mold and thus expands the entrained air. As the plastic cools down from this temperature range it has sufficient surface tension to prevent the liquid plastic from entering the holes 21. When the resin remains in the cavity 16 for up to about fifteen minutes until it cures at ambient or room temperature, bubbles 2 will be trapped or encapsulated within the body of the lure 1.

Figure 10:
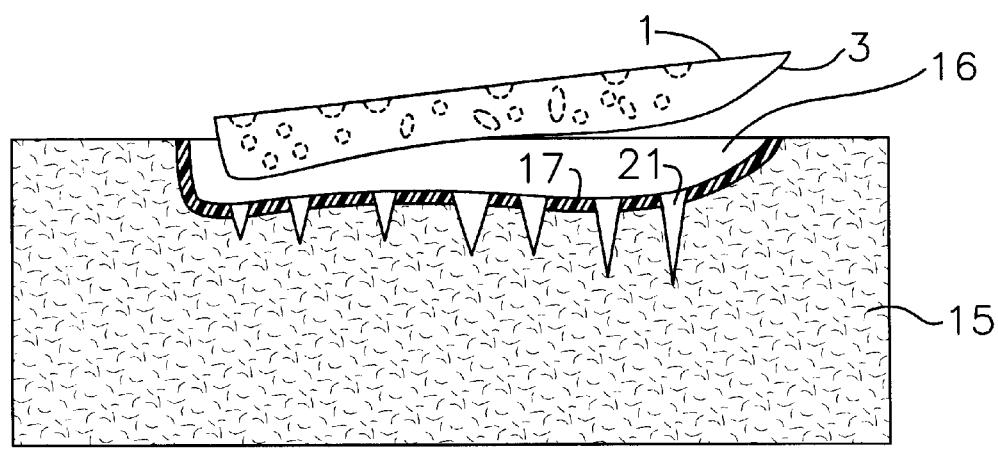
FIG. 10 is a schematic partially cross sectional side view of another step in the process of making fishing lures.

Some of the bubbles 2 will move upwardly through the liquid resin while it is curing until they burst through the upper surface 5. These eruptions will result in the craters 6 in the upper surface 5 of the lure. These craters 6 may be used by fishermen to hold scent or taste material on the lure 1. When the resin has finished curing, the lure 1 is removed from the cavity 16, as shown in FIG. 10. Since the porous ceramic interior of the mold 15 is now exposed to the atmosphere, ambient air enters the interior of the mold through the holes 21 and recharges the mold for creating bubbles 2 when the next lure 1 is cast.

The location of the bubbles 2 in the lure 1 can be controlled by predetermining the location of the holes 21 in the mold cavity 16. Holes may be selected within the preferred size range of about 0.0001 to about 0.050 inches to determine and control the size of the bubbles 2. For example, as shown in FIG. 8, the holes 21 adjacent the end 24 of the mold are larger than the holes 21 adjacent the opposite end 25. This results in the bubbles 2 at the corresponding end 3 of the lure body being a first general size that is larger than the second general size of the bubbles at the opposite end 4 of the lure. Similarly, FIG. 9 shows that relatively smaller holes 21 at the center of the mold result in smaller bubbles 2 at the center of the lure body than those produced by the larger holes 21 adjacent the outer edges of the mold. By thus controlling the size and location of the bubbles 2 within the body of lure 1, its buoyancy can be controlled. For example, one end or portion of the lure 1 may be made to float above a different end or portion of the lure. The action of the lure 1 as it is retrieved can also be influenced by controlling the size and location of the bubbles 2. There are no holes at the terminal end 24 so that there will not be any bubbles where the end 3 of the lure terminates. This makes the bubble-free end 3 stronger and better able to stay on a hook and resist the shearing forces that occur when a fish strikes the lure or when the lure snags.

Figure 11:
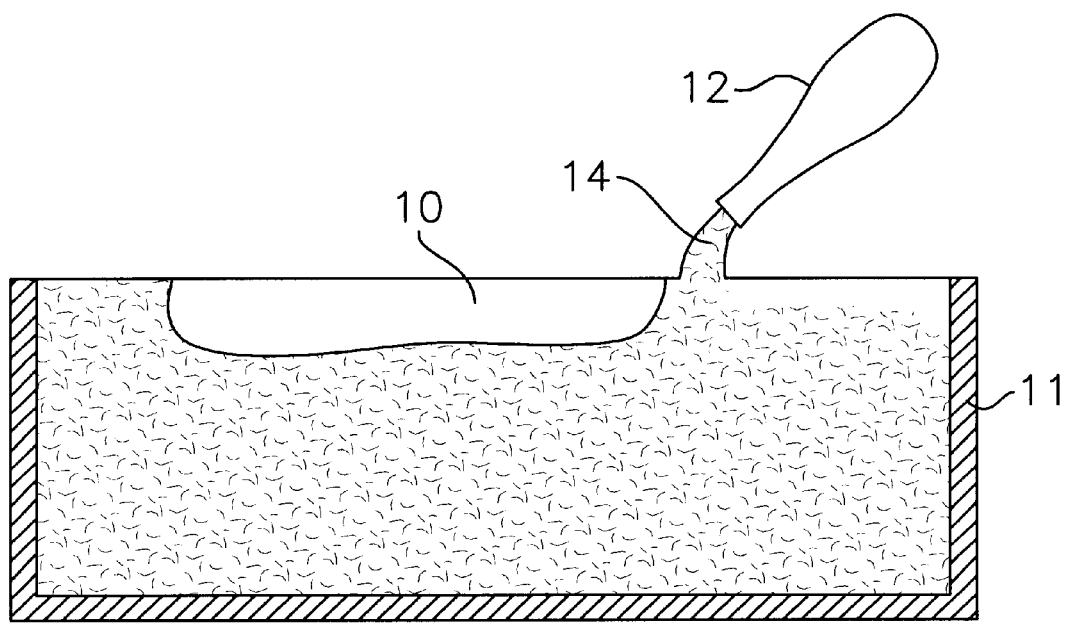
FIG. 11 is a schematic partially cross sectional side view of a step in another process of making fishing lures in accord with this invention.

FIG. 11 shows another embodiment of the invention that is identical to the above embodiment, except for the steps employed to create the cavity 16 in the mold 15. First a supply 12 of the uncured ceramic slip 14 is poured into the empty container 11 until the container is essentially filled. Then the model 10 of the lure is embedded by pressing it into the upper surface of the uncured slip 14. After the slip has cured, the model 10 is removed, and the remaining steps in the creation of the mold and the casting of the lure 1 are identical to those described above.

Figure 12:
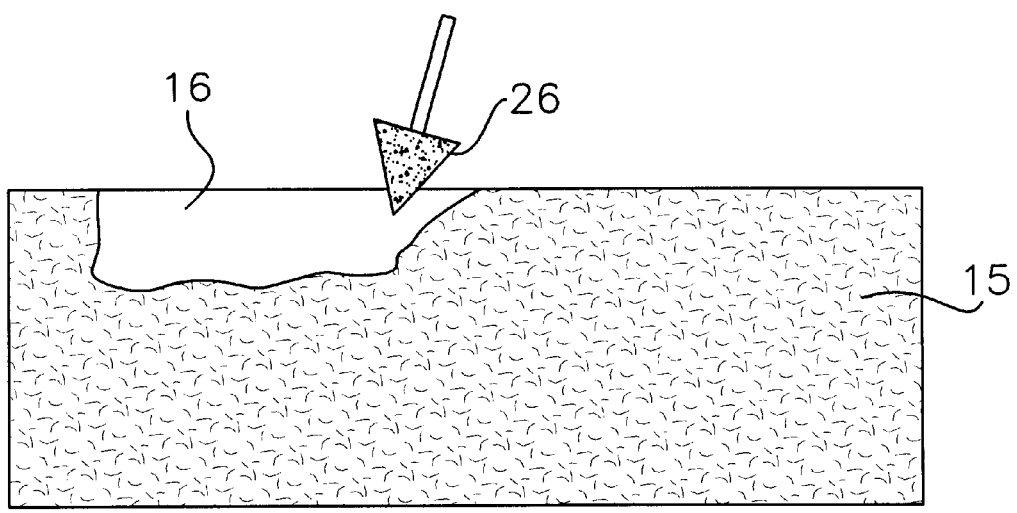
FIG. 12 is a schematic partially cross sectional side view of a step in another process of making fishing lures in accord with this invention.

FIG. 12 shows another embodiment of the invention that is identical to the above embodiments, except for the steps employed to create the cavity 16 in the mold 15. The slip 14 is poured into a container and allowed to cure as shown and described with references to FIG. 11 without embedding a model of the lure in the uncured slip. After the slip has cured, the body of the mold 15 is removed from the container and tools, such as a rotating burr 26 and/or hand chisels, are used to carve the cavity 16 in which the lure will be cast. The remaining steps in the creation of the mold and the casting of the lure 1 are identical to those described above.

While the present invention has been described with reference to particular embodiments and method steps, it is not intended to illustrate or describe all of the equivalent forms or ramifications thereof. For example, the lure body may be shaped to resemble any aquatic or land creature upon which fish feed, or the lure body may have any unnatural shape that provokes fish to strike. Also, the words used are words of description rather than limitation, and various changes may be made without departing from the spirit or scope of the invention disclosed herein. It is intended that the appended claims cover all such changes as fall within the true spirit and scope of the invention.

I claim:

1. A method of making a fishing lure having a predetermined shape from a predetermined material, comprising the steps of:

providing a porous air-containing body;

producing a cavity having said predetermined shape in said porous air-containing body;

covering said cavity with a non-porous coating;

producing a plurality holes in said non-porous coating in said cavity that vent said porous air-containing body through said holes at a plurality of spaced locations;

melting said material;

covering said holes in said cavity with melted material;

forming air bubbles inside of said melted material in said cavity by allowing air in said porous air-containing body to pass through said holes in said non-porous coating and into said melted material;

maintaining said melted material in said cavity for sufficient time to harden said melted material and trap said air bubbles inside said fishing lure, and removing from said cavity said fishing lure with air bubbles trapped inside.

2. The method of making a fishing lure defined in claim 1 further comprising, locating said cavity in an integral one-piece, porous, air-containing body so that said cavity is open to the atmosphere and said air passes upwardly through said holes.

3. The method of making a fishing lure defined in claim 1 further comprising, allowing said non-porous coating to harden in said cavity and then producing said holes by puncturing said non-porous coating.

4. The method of making a fishing lure defined in claim 3 further comprising, puncturing said non-porous coating with a sharp pointed tool that penetrates into said porous air-containing body.

5. The method of making a fishing lure defined in claim 1 further comprising, producing enough holes in said non-porous coating that the number of bubbles trapped in said fishing lure is sufficient to cause said fishing lure to float in water.

6. The method of making a fishing lure defined in claim 1 further comprising, preventing said melted material from flowing out of said cavity by producing holes in said non-porous coating that have a diameter less than about 0.050 inch.

7. The method of making a fishing lure defined in claim 6 further comprising, controlling the size of said air bubbles by producing holes in said non-porous coating that have a diameter in the range of from about 0.0001 to about 0.050 inches.

8. The method of making a fishing lure defined in claim 1 further comprising, melting said material by heating said material to a temperature in the range of about 280 degrees F to about 400 degrees F and pouring the melted material into said cavity.

9. The method of making a fishing lure defined in claim 8 further comprising, maintaining said melted material in said cavity until said material cools to essentially ambient temperature.

10. The method of making a fishing lure defined in claim 1 further comprising, maintaining said melted material in said cavity for about 15 minutes.

11. A The method of making a fishing lure defined in claim 1 further comprising, making said fishing lure from a plastic formulation that is soft and flexible when cooled.

12. The method of making a fishing lure defined in claim 1 further comprising, producing said cavity by preparing a model having said predetermined shape;

placing uncured porous air-containing ceramic slip in a container so as to embed said model in said uncured porous air-containing ceramic slip;

allowing said porous air-containing ceramic slip to cure around the model that is embedded therein;

removing the cured porous air-containing ceramic slip and embedded model from said container; and removing the embedded model from the cured porous air-containing ceramic slip.

13. The method of making a fishing lure defined in claim 1 further comprising, producing said cavity by casting a body of porous air-containing ceramic material; allowing said porous air-containing ceramic material to cure; and carving said predetermined shape into the cured porous air-containing ceramic body.

14. A method for controlling the number and location of air bubbles that cause a soft, flexible plastic fishing lure to float, said fishing lure having a predetermined shape, comprising the steps of:

providing a porous air-containing ceramic mold with a cavity having said predetermined shape that is open to the atmosphere;

coating said cavity with a layer of non-porous glaze;

producing a predetermined sufficient number of holes through said non-porous glaze into said porous air-containing ceramic mold at predetermined locations in said cavity so as to vent said porous air-containing ceramic mold through said holes sufficiently to release enough air from inside said porous air-containing ceramic mold to enable said fishing lure to float;

melting a supply of said plastic;

flowing sufficient melted plastic into said mold to cover said holes in said cavity with the melted plastic;

forming a sufficient number of air bubbles inside of said melted plastic in said cavity to enable said fishing lure to float by allowing air inside said porous air-containing ceramic mold to pass through said predetermined number of holes in said non-porous glaze at said predetermined locations in said cavity;

maintaining said melted plastic in said cavity for sufficient time to harden said melted plastic and trap said sufficient number of air bubbles in predetermined locations in said fishing lure; and removing from said mold said fishing lure with said sufficient number of air bubbles trapped in said predetermined locations that cause said fishing lure to float.

15. The method for controlling the number and location of air bubbles that cause a soft, flexible plastic fishing lure to float defined in claim 14, further comprising puncturing through said non-porous glaze holes that extend into said porous air-containing mold.

16. The method for controlling the number and location of air bubbles that cause a soft, flexible plastic fishing lure to float defined in claim 14, further comprising preventing said melted plastic from escaping into said porous air-containing mold by producing holes in said non-porous glaze that have a diameter less than about 0.050 inch.

17. The method for controlling the number and location of air bubbles that cause a soft, flexible plastic fishing lure to float defined in claim 14, further comprising controlling the size of said air bubbles by producing holes in said non-porous glaze that have a diameter in the range of about 0.0001 to about 0.050 inches.

18. The method for controlling the number and location of air bubbles that cause a soft, flexible plastic fishing lure to float defined in claim 14, further comprising melting said plastic by heating the plastic to a temperature in the range of about 280 degrees F to about 400 degrees F and pouring the melted plastic into said cavity.

* * * * *